United States Patent [19]

Peacock

[11] Patent Number: 4,914,570
[45] Date of Patent: Apr. 3, 1990

[54] PROCESS DISTRIBUTION AND SHARING SYSTEM FOR MULTIPLE PROCESSOR COMPUTER SYSTEM

[75] Inventor: J. Kent Peacock, San Jose, Calif.

[73] Assignee: Counterpoint Computers, Inc., San Jose, Calif.

[21] Appl. No.: 223,729

[22] Filed: Jul. 21, 1988

Related U.S. Application Data

[63] Continuation of Ser. No. 907,568, Sep. 15, 1986, abandoned.

[51] Int. Cl.$^4$ .......................... G06F 13/00; G06F 9/30
[52] U.S. Cl. .................................. 364/200; 364/229.2; 364/230.3; 364/280.9
[58] Field of Search ... 314/200 MS File, 900 MS File

[56] References Cited

U.S. PATENT DOCUMENTS

| | | | |
|---|---|---|---|
| 4,245,306 | 1/1981 | Besemer et al. | 364/200 |
| 4,354,227 | 10/1982 | Hays Jr. et al. | 364/200 |
| 4,459,664 | 7/1984 | Pottier et al. | 364/200 |
| 4,567,562 | 1/1986 | Fassbender | 364/200 |
| 4,621,318 | 11/1986 | Maeda | 364/200 |

OTHER PUBLICATIONS

K. Thompson, Unix Time-Sharing System: Unix Implementation, The Bell Sys. Tech. Journal, vol. 57, No. 6, pp. 1931–1946, Aug. 1978.
Gary Fielland and Dave Rodgers, 32-bit Computer System Shares Load Equally Among up to 12 Processors, Elect. Design, pp. 153–168, Sep. 6, 1984.
Bach and Buroff, A Multiprocessor Unix System, Usenix, pp. 174–177, Summer 1984.
Goble and Marsh, A Dual Processor VAX 11/780, Sigarch, vol. 10, No. 3, pp. 291–296, Apr. 1982.
Multiprocessor Makes Parallelism Work, Electronics, pp. 46–48, Sep. 2, 1985.
Bach and Buroff, Multiprocessor Unix Operating System, The Bell System Tech. Journal, vol. 63, No. 8, pp. 1733–1749, Oct. 1984.

*Primary Examiner*—Eddie P. Chan
*Attorney, Agent, or Firm*—Flehr, Hohbach, Test, Albritton & Herbert

[57] ABSTRACT

A multiple processor (CPU) computer system, each CPU having a separate, local, random access memory means to which it has direct access. An interprocessor bus couples the CPUs to memories of all the CPUs, so that each CPU can access both its own local memory means and the local memories of the other CPUs. A run queue data structure holds a separate run queue for each of the CPUs. Whenever a new process is created, one of the CPUs is assigned as its home site and the new process is installed in the local memory for the home site. When a specified process needs to be transferred from its home site to another CPU, typically for performing a task which cannot be performed on the home site, the system executes a cross processor call, which performs the steps of: (a) placing the specified process on the run queue of the other CPU; (b) continuing the execution of the specified process on the other CPU, using the local memory for the specified process's home site as the resident memory for the process and using the interprocessor bus to couple the other CPU to the home site's local memory, until a predefined set of tasks has been completed; and then (c) placing the specified process on the run queue of the specified process's home site, so that execution of the process will resume on the process's home site.

13 Claims, 6 Drawing Sheets

PROCESS DISTRIBUTION AND SHARING SYSTEM FOR MULTIPLE PROCESSOR COMPUTER SYSTEM

This is a continuation of application Ser. No. 907,568 filed Sept. 15, 1986, now abandoned.

The present invention relates generally to multiple processor computer systems, and particularly to apparatus and methods for moving a process from one site to another within a multiple processor computer system.

BACKGROUND OF THE INVENTION

The prior art includes a large number of different multiple processor computer systems, and a number of variations on the UNIX (a trademark of AT&T) operating system.

For the purposes of this introduction, multiple processor computer systems can be generally classified into two distinct types: (1) those that perform complex calculations by allocating portions of the calculation to different processors; and (2) those that are enhanced multitasking systems in which numerous processes are performed simultaneously, or virtually simultaneously, with each process being assigned to and performed on an assigned processor. The present invention concerns the second type of multiple processor system.

In order to avoid confusion between the terms "processor" (which is a piece of apparatus including a central processing unit) and "process" (which is a task being performed by a computer), the terms "site" and "CPU" shall be used herein synonymously with "processor". For instance, when a process is created, it is assigned to a particular site (i.e., processor) for execution.

As background, it should be understood that in any multitasking system, there is a "run queue" which is a list of all the processes which are waiting to run. In most systems the run queue is a linked list. When the system is done with one process (at least temporarily) and ready to start running another process, the system looks through the run queue and selects the process with the highest priority. This process is removed from the run queue and is run by the system until some event causes the system to stop the selected process and to start running another process.

In prior art multiple processor (also called multiple CPU) systems, there is generally a single large memory and a single run queue for all of the processors in the system. While the use of a single run queue is not inherently bad, the use of a single large memory tends to cause increasing memory bus contention as the number of CPUs in the system is increased.

Another problem associated with most multiple CPU computer systems, only one of the CPUs can perform certain tasks and functions, such as disk access. Therefore if a process needs to perform a particular function, but is running at a site which cannot perform that function, the computer system needs to provide a method for that process to perform the function at an appropriate site within the system.

Generally, the problems associated with such "cross processor calls" include (1) minimizing the amount of information which is moved or copied from one site to another each time a process makes a cross processor call; (2) devising a method of updating the system's run queue(s) which prevents two processors from simultaneously changing the same run queue, because this could produce unreliable results; and (3) providing a method for efficiently transferring a process to a another site and, usually, then automatically transferring the process back to its original site.

The present invention solves the primary memory contention and cross processor call problems associated with prior art multiple CPU systems by providing a separate local memory and a separate run queue for each processor. Memory contention is minimized because most processes are run using local memory. When a process needs to be transferred to a specified processor a cross processor routine simply puts the process on the run queue of the specified CPU. The resident memory for the process remains in the local memory for the process's home CPU, and the specified CPU continues execution of the process using the memory in the home CPU. The process is transferred back to its home CPU as soon as the tasks it needed to perform on the specified CPU are completed.

It is therefore a primary object of the present invention to provide an improved multiple CPU computer system.

Another object of the present invention is to provide an efficient system for transferring processes from one CPU to another in a multiple CPU computer system.

SUMMARY OF THE INVENTION

In summary, the present invention is a multiple processor (CPU) computer system, each CPU having a separate, local, random access memory means to which it has direct access. An interprocessor bus couples the CPUs to memories of all the CPUs, so that each CPU can access both its own local memory means and the memory means of the other CPUs. A run queue data structure holds a separate run queue for each of the CPUs.

Whenever a new process is created, one of the CPUs is assigned as its home site and the new process is installed in the local memory means for the home site. When a specified process needs to be transferred from its home site to another CPU, typically for performing a task which cannot be performed on the home site, the system executes a cross processor call, which performs the steps of: (a) placing the specified process on the run queue of the other CPU; (b) continuing the execution of the specified process on the other CPU, using the memory means for the specified process's home site as the resident memory for the process and using the interprocessor bus means to couple the other CPU to the home site memory means, until a predefined set of tasks has been completed; and then (c) placing the specified process on the run queue of the specified process's home site, so that execution of the process will resume on the process's home site.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
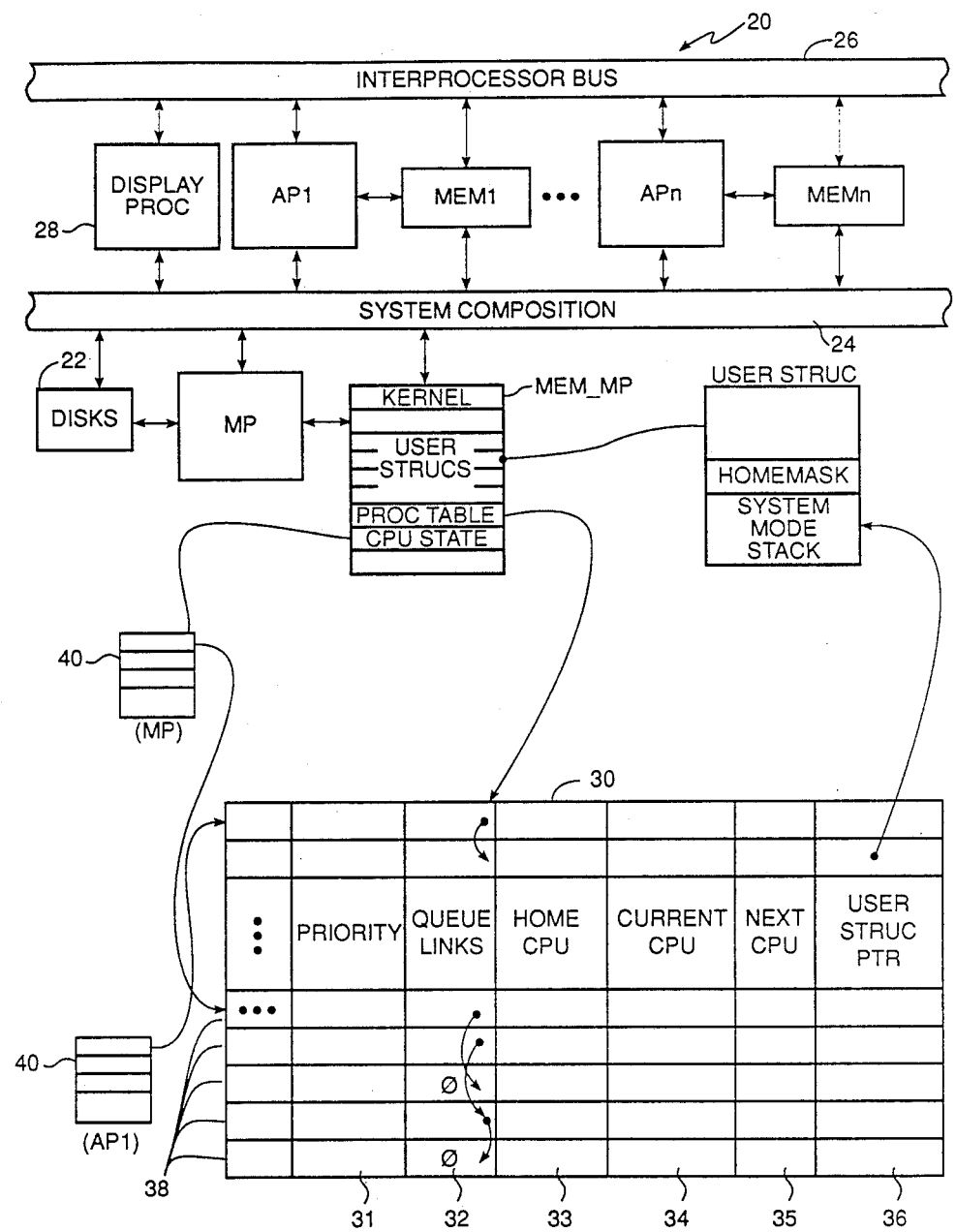
FIG. 1 is a block diagram of a multiprocessor computer system, and some of its most important data structures, in accordance with the present invention.

Referring to FIG. 1, there is shown a block diagram of a multiprocessor computer system 20, and some of its most important data structures, in accordance with the present invention. In a typical configuration, the system 20 includes a main processor MP, and a plurality n of application processors AP1 to APn.

All of the system's processors are homogeneous, separate one-board microcomputers using a Motorola 68020 central processing unit. For convenience, these processors are also called "CPUs" and "sites".

The system 20 is a multitasking computer system which typically has a multiplicity of processes, also called "user processes" or "tasks", running and waiting to run. As will be described in greater detail below, each user process is assigned a "home site" or "home processor" when it is created.

Cross Processor Calls

The present invention provides a simple system for temporarily moving a user process away from its home site to a specified remote site. To do this, the state of the process is saved (just as it would be saved whenever the process is suspended in any other multitasking system), and then a pointer to the user process is simply added to the remote site's "run queue" and removed from the list of processes running on the home site.

When the remote site picks up this user process from its run queue, it merely reinstates the process and runs the process just like any other process. After the task which required the cross processor call is completed, the interprocessor transfer is reversed by saving the user process's state and adding a pointer to the user process to the run queue for its home site.

The system's memory is organized so that the remote site can use the user process's memory at its home site, rather than moving the process's resident memory to the remote site.

There are several advantages to this approach. The first is that the context which requires a user process to be moved away from its home site need not be copied into a message encapsulating the request, and all references to parameters needed by the process can be made directly to the process's resident memory at the home site. Secondly, there is no need to synchronize one processor with any other. Third, the cross processor call is virtually transparent to the system and requires very little overhead and minimal modification of the system's operating system. In most instances, the only modification to the operating system required is the insertion of a cross processor call in system routines which must be executed on a specified CPU.

Figure 2A:
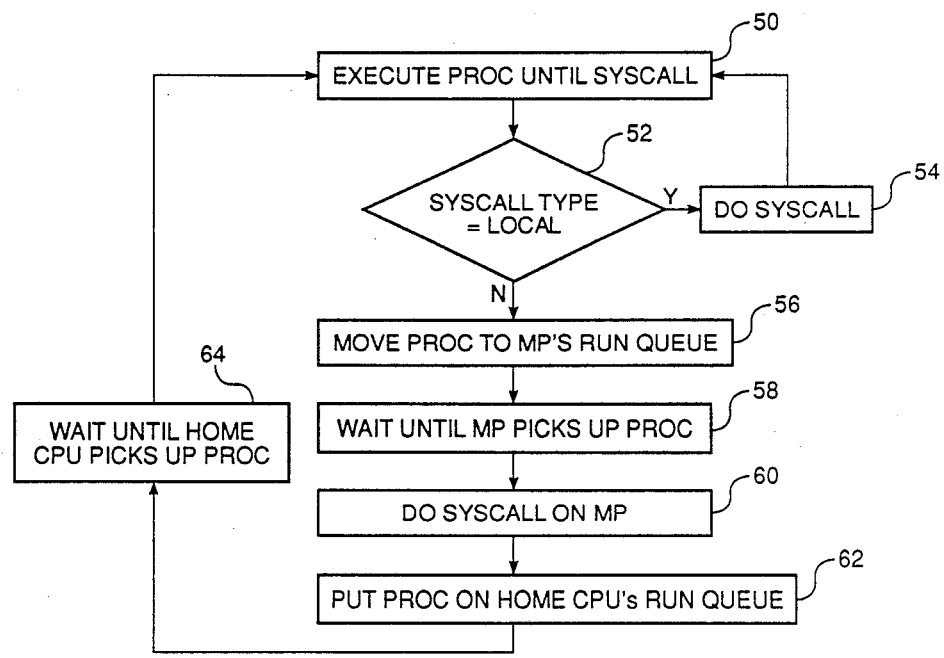
FIGS. 2A and 2B schematically represent the cross processor call procedure of the preferred embodiment.
Figure 2B:
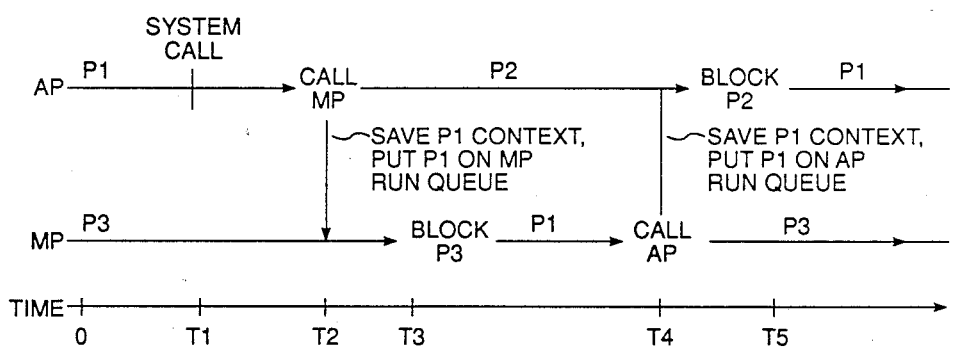

In the preferred embodiment cross processor calls are performed only to have a system request serviced which cannot be serviced at the home site of the process. FIGS. 2A and 2B schematically represent the cross processor call procedure of the preferred embodiment.

Referring to FIG. 2A, the process identified as Proc is assumed to have a home site on an applications processor (i.e., not the main processor) and to be running on that home site. The process runs until a system routine is called (box 50). If the system routine can be run locally (box 52), the system routine is simply executed (box 54) and the process continues to run on the home site (box 50).

If, however, the system routine cannot be run locally (box 52), then the process is put on the main processor's run queue (box 56), where it waits until the main processor MP picks it up for execution (box 58). Then the process resumes running on the MP, where it runs the system routine.

After the system routine completes the tasks which need to be performed by the MP, the process is put back on the home site's run queue (box 62), where it waits until the home CPU is ready to pick it up (box 64) and to continue execution of the process (box 50).

Looking at this same process from another perspective, in FIG. 2B at time zero process P1 is running on processor AP and process P3 is running on the main processor MP. At time t1 process P1 performs a system call (i.e., it calls a system routine) which requires processing on the MP. Therefore, shortly after the system call, at time t2, P1's context is saved (in its user structure) and P1 is put on MP's run queue. It should be noted that P1 is usually given a high priority when it performs a cross processor call so that its request will be serviced quickly. Also, when the AP stops running P1 it picks up another process P2 from its run queue and runs that process.

MP continues to run process P3 until some event blocks or interrupts P3's execution at time t3, at which point the MP will run P1. At time t4, when P1 finishes the system tasks which required the use of the main processor MP, P1's context is saved and it is put back on the run queue for its home site, AP. At this point the MP picks up the highest priority process from its run queue, which may be the process P3 that was interrupted by P1.

AP continues to run process P2 until some event blocks or interrupts P2's execution at time t5, at which point the AP will pick up the highest priority process from its run queue, which may be the process P1.

Memory

Referring again to FIG. 1, each CPU has its own memory module MEM_MP, and MEM1 to MEMn, which is used as the primary random access memory for its corresponding CPU.

The resident memory for each user process in the system is located in the memory module for its home site.

While each CPU has its own memory module, these memory modules are multiported and connected to at least one bus so that all physical memory in the system can be accessed by any processor in the system. That is, all of the system's physical memory resides in a single, large physical address space. Also, any given processor can use the page tables describing the virtual memory of any other processor.

As a result of this memory organization, any user process in the system can execute on any of the system's processors, even though the user process's resident memory is located on only one processor (the home site).

Since access to local memory (i.e., access by a CPU to its own memory module) is much faster than cross-processor memory access, the system is designed to run a process as much as possible on its home processor, and to move its execution to another processor only when necessary. Normally, a process's execution is moved away from its home site only to have a system request serviced which cannot be serviced at the home site.

The main processor's memory module MEM_MP holds a number of important data structures including a Process Table 30 which holds essential data regarding each of the processes in the system, a CPUSTATE data structure which contains important data on the status of the processor, and a set of USER data structures which hold data relating to the state of each process allocated to the main processor.

Each processor has a CPUSTATE data structure, which is stored in its local memory. Each processor's local memory also has an array of USER data structures, which are used to hold data relating to the processes allocated to that processor. The details and uses of these data structures are explained below.

Operating System

All of the CPUs use a modified UNIX operating system. (UNIX is a trademark of AT&T Bell Laboratories.) Full UNIX functionality is available in all the processors. To accomplish this, the UNIX kernel has been modified by dividing or replicating portions of the kernel among the MP and attached APs, and adding new interprocessor communication facilities. The interprocessor communication facilities allow requests which cannot be handled locally (e.g., on one of the APs) to be handled by another processor (e.g., the main processor MP).

For those not skilled in the art, it should be known that the term "kernel" is generally used to refer to a set of software routines, including system routines which handle most of the system's hardware dependent functions—such as disk access and other input and output operations. The UNIX kernel is typically copied from disk into the system's random access memory (e.g., the main processor's memory MEM_MP) whenever the system is restarted.

The main difference between the main processor MP and the applications processors AP1 to APn is that the main processor MP is the only processor that can perform certain system functions. For instance, the main processor is the only one which can access the system's disk storage units 22.

The primary goal for the allocation of system functions between the processors is to make the operation of each processor as autonomous as the system's hardware configuration will allow. In other words, each AP is allowed to perform as many system functions locally as is consistent with the system's hardware. This minimizes the frequency of interprocessor function calls and interprocessor memory access.

Interprocessor Busses

Another difference between the main processor MP and the applications processors AP1 to APn is that the main processor has different interprocessor bus connections than the other processors.

The system 20 includes two interprocessor busses 24 and 26. One, called the system composition bus 24, can transfer data between processors at a rate of 12 megabytes per second (12 MB/sec). The other bus, called the interprocessor bus 26, can transfer data between processors at 33.3 MB/sec. The provision of two such busses allows the faster bus to handle video tasks and other task which require high data rates, while the slower bus handles interprocessor memory requests between the main processor and one of the applications processors.

All of the applications processors, AP1 to APn and the system's Display Processor 28 are connected to both busses 24 and 26. The main processor MP is not connected to the faster bus mostly to avoid the cost of adding another high speed port to the main processor, which is already burdened with the disk controller and two terminal ports (not shown in the Figures).

Indivisible Read-Modify-Write Instructions

As will be explained in more detail below, the processors in the system must be able to perform at least one of the "indivisible read-modify-write instructions" known as test and set (TAS), or compare and swap (CAS). Basically, an "indivisible read-modify-write instruction" is an instruction which involves two steps, a test step and then a conditional data writing step, which cannot be interrupted until it is complete.

For instance, the TAS instruction can be used to test if the top bit of a specified memory location is equal to zero, and, if so, to set it equal to one. Making this instruction "indivisible" ensures that while processor AP1 performs a TAS on memory location X, no other processor can modify X. Otherwise, another processor, such as MP or AP2 could modify X after AP1 had tested X's value but before AP1 was able to set X to 1.

An indivisible compare and swap (CAS) instruction works similarly to the TAS instruction, except that the first step compares a first CPU register with a memory location, and the second step stores the value in a second CPU register into the memory location if the comparison's test criterion is satisfied.

In addition to the run queue lock, indivisible read-modify-write instructions are used for updating all data structures that could otherwise be simultaneously accessed and modified by more than one processor. In other words, each such data structure must have a corresponding lock flag and an indivisible read modify write instruction must be used to test the lock flag before the corresponding data structure is updated. Data structures, such as the USER structure, which cannot be simultaneously accessed by more than one processor do not need this lock protection. As will be understood by those skilled in the art, an example of another data structure which requires the use of a lock flag is the sleep queue for each processor.

Process Table

In the main processor's memory module there is a data structure called the process table 30. This table has one row 38 of data for each user process in the system, including the following data which are used in the present invention.

There is a priority parameter 31 which indicates the relative priority of the process. In the preferred embodiment, numerically low priority parameter values are used to indicate high process priority. User processes are assigned priority values between 127 (the lowest priority) and 25 (the highest priority), while system tasks are assigned priority values between 24 and zero.

Each process in the system is either actively running, is waiting to run, or is temporarily inactive. The processes waiting to run on each processor are placed on separate run queues. Similarly, there is a set of sleep queues for temporarily inactive processes, and actively running processes are not on any queue as long as they are running.

Each run queue is simply a linked list formed using the queue link parameter 31 in the process table 30. For each CPU there is a CPUSTATE data structure 40 which points to the row 38 of the process table 30 for the first process in its run queue. The queue link 31 for that process points to the row of the process table for the next process in the processor's run queue, and so on. The entry for the last process in each run queue has a zero in its queue link to indicate that it is at the end of the queue.

For each process, the process table 30 also includes a Home CPU parameter 33 which identifies the assigned home CPU for the process, and a Current CPU parameter 34 which identifies the current CPU on which it is running or waiting to run. The Next CPU parameter 35 is used in cross processor calls to indicate the CPU on which the process is to be run:

Finally, for each process there is a User Struc parameter 36 which points to the User Structure for the process. A separate User Structure, which is a (3072 byte) buffer, is assigned to every process for storing the state of the process, certain special parameters, and for holding a stack called the system mode stack that is used when the process performs certain system mode functions.

While the process table 30 contains other parameters used by the UNIX operating system, only those used for cross processor calls are described herein.

CPUSTATE Data Structure

Figure 3:
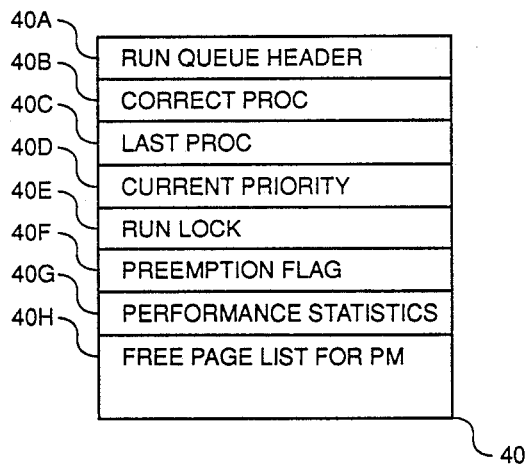
FIG. 3 is a block diagram of the CPUSTATE data structure used in the preferred embodiment of the present invention.

FIG. 3 is a block diagram of the CPUSTATE data structure used in the preferred embodiment of the present invention. There is one CPUSTATE data structure for each processor in the system.

The CPUSTATE data structure for each processor contains the following parameters. A Run Queue Header 40a points to the row of the process table 30 for the first process in the processor's run queue. A somewhat simpler way to state this is to say that the Run Queue Header 40a points to the first process in the run queue for the corresponding processor.

The Current Proc parameter 40b points to the row of process table 30 for the process currently running in the processor. The Last Proc parameter 40c points to the row of process table 30 for the last process which ran in the processor before the current process began running.

The Current Priority parameter 40d is the priority value for the process currently running in the processor.

The Run Lock parameter 40e is a flag which is normally equal to zero. Any processor which wants to update or modify the processor's run queue is required to check this flag using a TAS instruction before proceeding. If the Run Lock flag is not zero, then some other processor is modifying the run queue and the first processor must wait until it is done. To prevent excessive bus traffic caused by such situations, if a processor finds that a run queue is locked, it is forced to wait a preselected amount of time (e.g., 0.01 milliseconds) before testing the Run Lock again.

If the Run Lock is equal to zero, the run queue is unlocked and the process performing the test sets the Run Lock before proceeding to modify the processor's run queue. When the processor is done with the run queue, it unlocks the run queue by resetting the Run Lock to zero.

The Preemption Flag parameter 40f is used to force the processor to look on its run queue for a process of higher priority than the currently running process. Normally, the search for a new process is performed only when the currently running process finishes or reaches a block (such as a cross processor call) which causes it to stopped, at least temporarily. The current process can be preempted, however, if the Preemption Flag 40f is given a nonzero value.

Toward the end of the processing of every interrupt which can interrupt a user process, the Preemption Flag 40f is checked. If the Preemption Flag is nonzero, a search for a higher priority process than the currently running process is initiated. If a higher priority process is found, the current process is stopped and saved, and the higher priority process is run. In any case, at the end of the preemption search, the Preemption Flag 40f is automatically reset to zero.

The set of interrupts which can initiate a preemption search include the interrupt generated by a processor when it puts a high priority process on the run queue of another processor, and a clock interrupt, which occurs 64 times per second.

Next, the CPUSTATE data structure contains a set of Performance Statistics 40g which, as described below, are used to help select to a home site for each new process created by the system 20.

The CPUSTATE data structure 40 also contains a list 40h of the free pages in its physical memory for use by its virtual memory management system:

Cross Processor Calls

Figure 4:
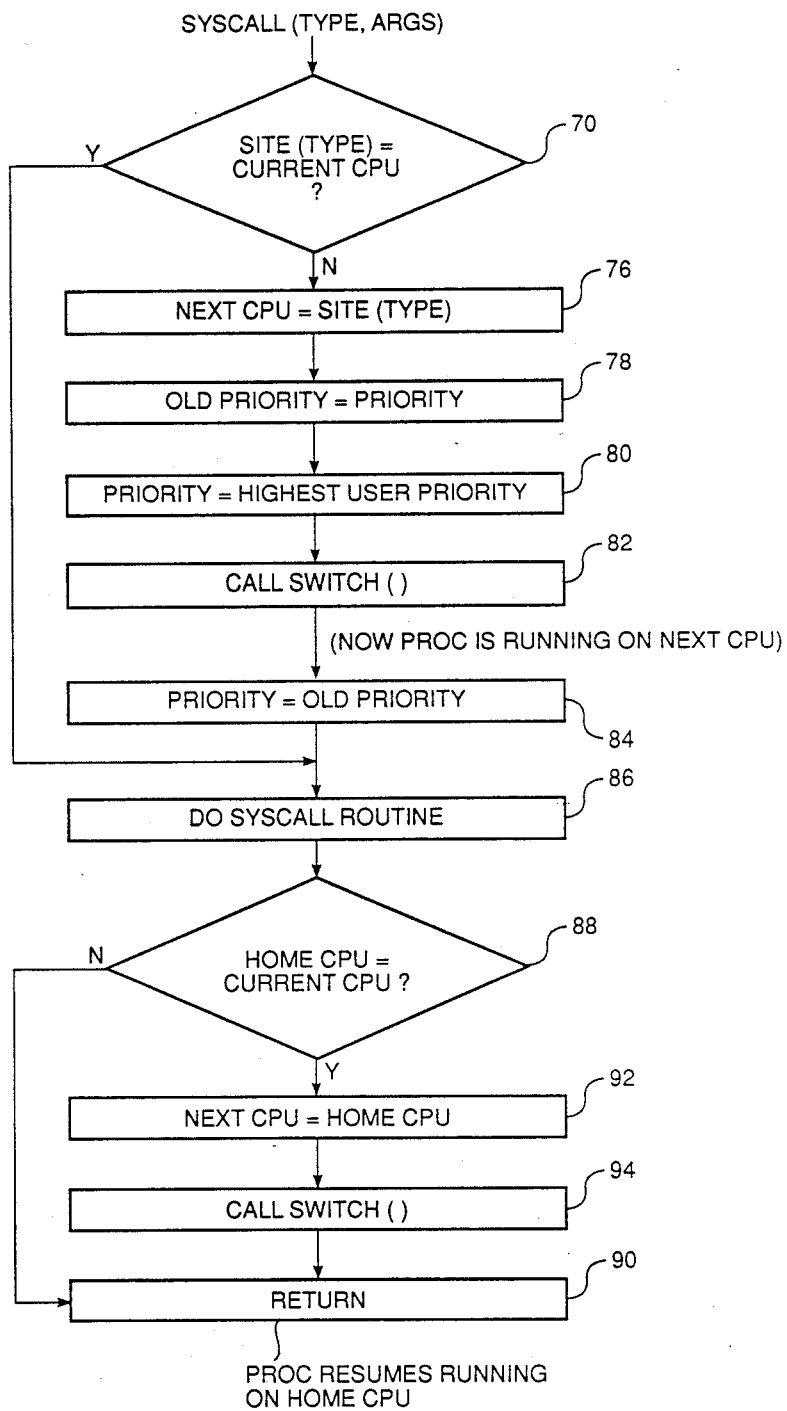
FIG. 4 is a flow chart of the process by which a system subroutine call may cause a process to be moved from one site to another in a computer system.

FIG. 4 is a flow chart of the process by which a system subroutine call may cause a process to be moved from one site to another in a computer system. This is essentially a more detailed version of FIG. 2A.

Figure 5:
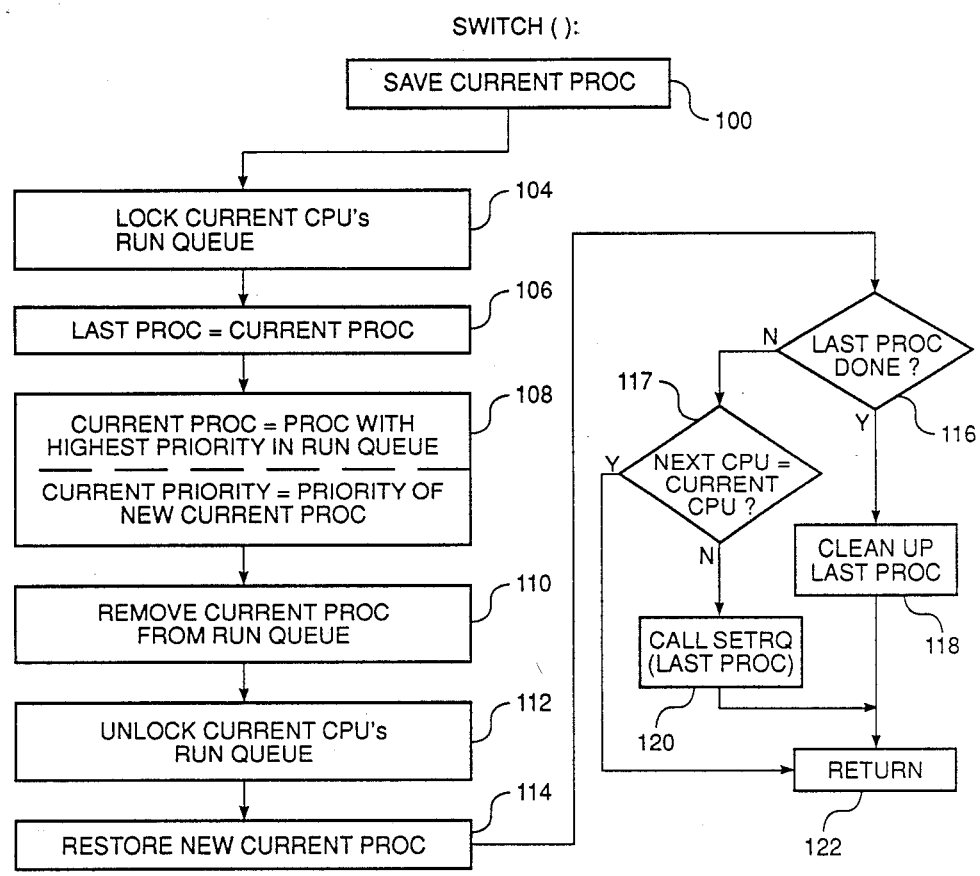
FIG. 5 is a flow chart of the context switching method used in the preferred embodiment of the invention to move a process from one site to another in a computer system.
Figure 6:
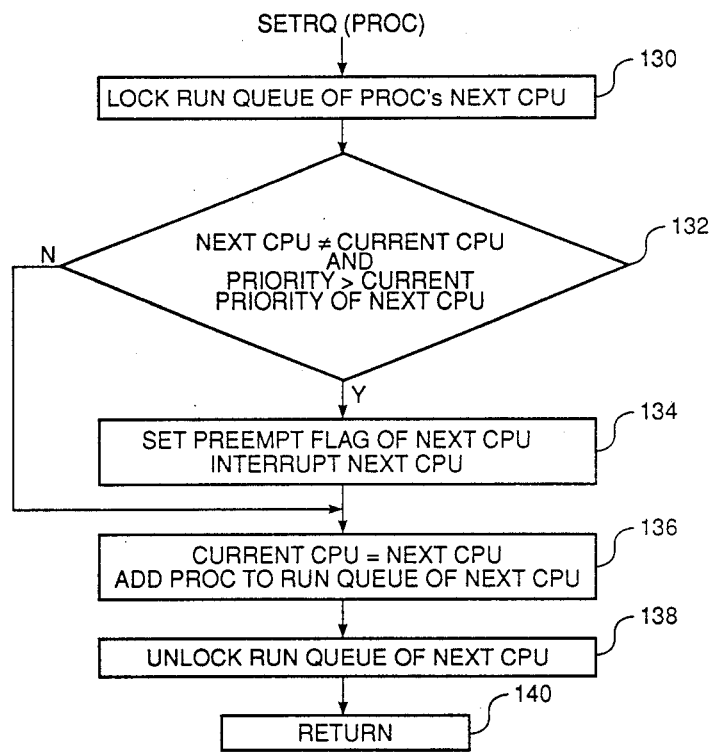
FIG. 6 is a flow chart of the subroutine SETRQ which is used by the context switching method diagramed in FIG. 4.

For the purpose of explaining FIGS. 4 through 6, the term "the process" is used to refer to the process which has made a syscall or other subroutine call which has caused a cross processor call to be made.

Whenever a syscall (i.e., a system subroutine call) is made the system first checks to see if the syscall can be run on the current CPU of the process which made the call (box 70). If so, the syscall routine is performed locally (box 86) and, assuming that the process is running on its home CPU (box 88), it returns to the process that performed the syscall (box 90).

If the syscall cannot be performed locally, the following steps are performed. The parameter in the process table called Next CPU is set equal to a pointer to a processor (i.e., to the CPUSTATE data structure for a processor) which can perform the syscall (box 76). Then a variable called Old Priority is set equal to the process's priority (box 78) (which is obtained from the priority entry for the current process in the process table) so that this value can be restored after a context switch is performed.

Next, the process's priority is set to the highest user priority allowed by the system (box 80). This is done so that the process will be serviced as quickly as possible by the main processor.

The context switch itself is performed by calling a routine called SWITCH (box 82), which is described below in detail with reference to FIGS. 5 and 6. The process is now running on the processor pointed to by the Next CPU parameter in the process table 30. In the preferred embodiment, the Next CPU is always the main processor MP, but in other embodiments of this invention the Next CPU could be any processor in the system.

Once the context switch has been made, the process's original priority is restored (box 84) and the syscall routine is performed (86). Then the process is returned to its home cite (boxes 88 to 94). This is done by first checking to see if the current CPU is the process's Home CPU (box 88).

If the Current CPU is the process's Home CPU, no further processing is required and the routine returns (box 90). Otherwise a context switch back to the process's Home CPU is performed by setting the Next CPU parameter equal to the process's Home CPU (box 92), calling SWITCH (box 94), and then returning (box 90).

In the preferred embodiment of the invention, the restoration portion of the syscall handling routine, boxes 88 to 94, is kept simple because (1) there is only one processor to which processes are sent for handling special functions (i.e., the main processor), and (2) none of the syscall routines call other syscall routines. As a result, a process is always returned to its Home CPU after a syscall is complete.

As will be understood by those skilled in the art, in other embodiments of the invention a process might "return" to a CPU other than the process's Home CPU. In such a system a "Return CPU" parameter would have to be added to the system. In such a system, box 88 will be replaced by a query regarding whether "Current CPU=Return CPU?", and if not, the process will be SWITCHed to the Return CPU, which may or may not be the Home CPU.

FIG. 5 is a flow chart of the SWITCH routine used in the preferred embodiment of the invention to move a process from one site to another in a computer system. The first step (box 100) of this routine is to save the context of the current process by storing its registers and such in its USER data structure (see FIG. 1).

Then the run queue for the Current CPU is locked (using the the RUN LOCK 40e in the CPUSTATE data structure for the Current CPU) (box 104) and the LAST PROC parameter 40c is set equal to CURRENT PROC 40b. This reflects the fact that the current process will no longer be running, and hence will be the last process to have run.

Next the CURRENT PROC parameter 40b is set equal to a pointer to the process on the run queue with the highest priority, and the CURRENT PRIORITY parameter 40d is set equal to this new process's priority (box 108). Then the new CURRENT PROC is removed from the run queue (by modifying the run queue's linked list using standard programming techniques) (box 110) and the Current CPU's run queue is unlocked (box 112) by setting the RUN LOCK parameter 40e to zero. Finally, the new current process is started up by restoring the process's context from its USER structure and "resuming" the process (box 114).

Now that the processor which was running the user process has been set up with a new process, the SWITCH program continues by setting up the NEXT CPU to run the user process which is undergoing the context switch. These steps are performed whenever a context switch is done—i.e., only when the NEXT CPU is not the CURRENT CPU (box 117).

If the process which called SWITCH (now called LAST PROC) is done, or otherwise ready to exit (box 116), and doesn't need any further processing except to be cleaned up and removed from the system, then this clean up is done (box 118) and the SWITCH routine exits (box 122).

Otherwise, if the process (called LAST PROC) is being moved to a new CPU (i.e., its NEXT CPU is not the same as its CURRENT CPUT) (box 117) the SETRQ routine is called (box 120) to move the process identified by LAST PROC to its home site.

If the process which called SWITCH is being suspended (i.e., being put on a sleep queue) or is not switching processors for any other reason (box 117) then the SWITCH routine exits instead of calling SETRQ. Thus the SWITCH is used not only for context switching, but also for activating a new process whenever a CPU's currently running process is suspended.

FIG. 6 is a flow chart of the subroutine SETRQ which is used by the context switching method diagramed in FIG. 5. The SETRQ routine receives as a parameter a pointer to a process which needs to be put onto the run queue of its NEXT CPU, as identified by the entry in the process table 30 (FIG. 1) for that process.

The first step (box 130) of the SETRQ routine is to lock the run queue of the process's NEXT CPU, using an indivisible TAS instruction on the Run LOCK for that CPU. As indicated above, if the Run LOCK for the NEXT CPU is already locked, the system waits for a short period of time and then tries the TAS instruction again, repeating this process until the Run LOCK is unlocked by whatever process was previously using it.

Once the NEXT CPU's run queue is locked, the routine checks to see if the Current CPU is the same as the NEXT CPU (box 132). If so, the process is simply added to the run queue of the current (i.e., NEXT) CPU (box 136) and the run queue for the NEXT CPU is unlocked (box 138) by setting its Run LOCK to zero.

If the current CPU is not the same as the NEXT CPU (box 132) then the Preemption Flag of the NEXT CPU is set and the NEXT CPU is sent a software interrupt (box 134). Then the Current CPU parameter is set equal to NEXT CPU, the process is added to the run queue of the NEXT CPU (box 136) and the NEXT CPU's run queue is unlocked.

The purpose of setting the Preempt Flag and generating an interrupt for the NEXT CPU (box 134) is to force the NEXT CPU to service the process as soon as possible. This combination of steps forces the NEXT CPU to preempt the currently running process with the process added to the run queue, which has been given the highest user priority (see box 108 in FIG. 5). The reason that the interrupt is sent to the NEXT CPU before the process is added to the NEXT CPU's run queue is simply to speed up the process of transferring the process to the NEXT CPU. In effect, the NEXT CPU is forced to begin the process of looking for a new process as soon as possible, but will not actually look through its run queue for the highest priority process therein until its run queue is unlocked several instruction cycles later.

Process Creation and Home Site Selection

Figure 7:
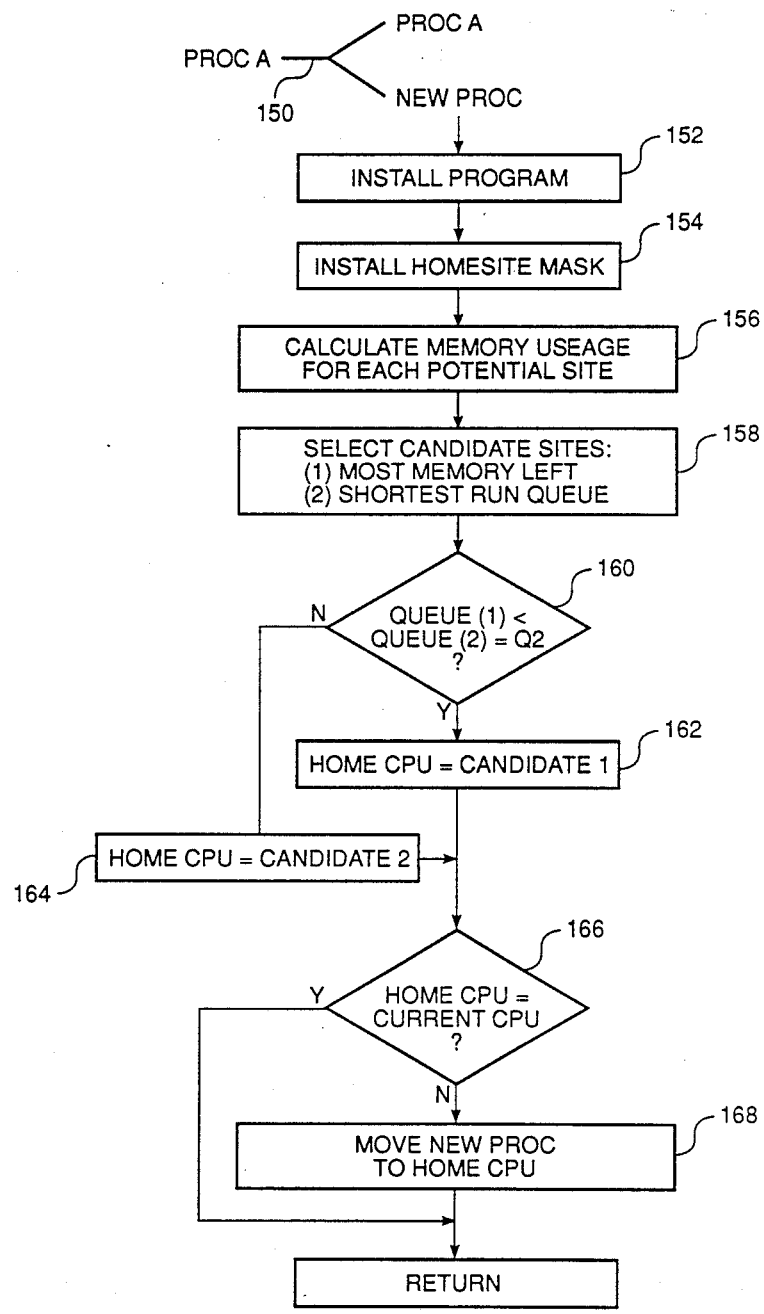
FIG. 7 is a flow chart of the method used for creating a new process and assigning it a home site.

Referring to FIG. 7, new processes are created in UNIX systems by a two step process: a fork (box 150) which duplicates an already existing process, and an "exec" step (box 152) which replaces the duplicated process's control program with a program from a specified file.

In systems incorporating the present invention, process creation requires an additional step: selection of a home cite for the new process. In the preferred embodiment, the selection of a home site works as follows.

First (box 154), the process inspects the HOMEMASK parameter for the new process. The HOMEMASK parameter is loaded into the new process's USER structure when the process is created from the paren process at the fork step (box 150). It is a mask that indicates which CPUs the new process can use as a home site. In particular, each bit of the HOMESITE parameter is equal to 1 if the corresponding CPU can be used as a home site, and is equal to 0 if is can't.

The remainder of the home site selection process is restricted to sites allowed by the process's HOMESITE.

Second (box 156), the system calculates the expected memory usage of the new process for each of the processors permitted by its HOMESITE parameter. The process may use less memory in some processors than in others because it may be able to share code already resident at those sites.

Third (box 158), the system picks two candidate sites: (1) the site which would have the most memory left if the process were located there; and (2) the site with the smallest average run queue size which also has enough memory to run the process.

Fourth (boxes 160-164), the system selects as the process's home site, the first candidate if its average queue size is less than the the second candidate's average queue size plus a preselected quantity QZ (a system parameter selected by the person setting up the system, typically equal to 0.5). Otherwise the second candidate site is selected as the home site.

It should be noted that the average queue size for every processor is stored in the Performance Statistics portion 40g of the processor's CPUSTATE data structure, and is updated by the system's clock routine sixty-four times per second.

Also, it can be seen that the selection of a home site is generally weighted in favor of sites with the most memory available.

Finally (boxes 166-168) the new process is moved to its new home site (if it isn't already there), by setting its HOME CPU parameter to the new site, copying its USER structure and resident memory into the memory of the home site, and putting the new process on the home site's run queue by calling SETRQ (not shown as a separate step in FIG. 7).

Memory Management

The UNIX kernel is initially copied from disk into the main processor's random access memory MEM_MP whenever the system is restarted. The other processors initially access the kernel's routines by performing nonlocal memory accesses over the syststem composition bus 24 to MEM_MP.

For purpose of efficient operation, a copy of the portions of the UNIX kernel used by each application processor is copied into local memory. This is done so that each processor can run kernel code without having to perform nonlocal memory access, which is very slow compared to local memory access.

The process by which the kernel code is copied to local memory is as follows.

Figure 8:
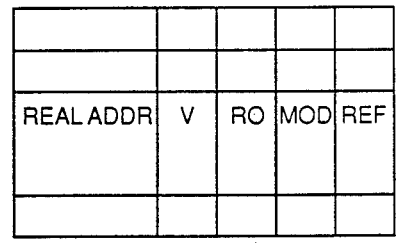
FIG. 8 is a block diagram of a virtual memory management page table used in the preferred embodiment of the present invention.

FIG. 8 is a block diagram of a virtual memory management page table used in the preferred embodiment of the present invention. The use of page tables by the memory management units is well known in the prior art. However, the present invention makes special use of this table.

For each page entry in the MMU page table there is a space for storing a real (i.e., physical) memory address, a "v" flag which indicates if the real memory address is valid (i.e., it indicates whether the page is currently stored in resident memory), a read only RO flag which indicates, if enabled, that the corresponding page cannot be overwritten; a MOD flag, which is enabled if the contents of the page have been modified since the page was first allocated; and a REF flag, which is enable if the contents of the page have been accessed in any way (i.e., either read or written to) since the page was first allocated.

When the system is first started up, the MMU Page Tables in each processor contain entries for all of the UNIX kernel code, with real addresses in the main processor's memory MEM_MP. Every five seconds, a special program in the main processor writes into local memory a copy of all the kernel pages which have been referenced by each applications processor and which have not yet been copied into local memory. References to these pages are thereafter handled by reading local memory rather than the main processor's memory.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, in other embodiments of the present invention, the system's functions could be distributed in such a way that different syscall routines might require cross processor calls to a plurality or multiplicity of different corresponding processors.

Also, in some embodiments of the present invention there could be a dynamic load balancer which would periodically compare the loads on the various processors in the system. The load balancer would be programmed to select candidate processes for being shifted to new home sites, and to transfer a selected process to a new home site if the load on its current home site becomes much heavier than the load on one or more of the other processors in the system.

What is claimed is:

1. A computer system, comprising:
   a multiplicity of distinct central processing units (CPUs), each having a separate, local, random access memory means to which said CPU has direct access;
   at least one interprocessor bus coupling said CPUs to said multiplicity of memory means, so that each CPU can access both its own local memory means and the memory means of the other CPUs;

run queue means coupled to said CPUs for holding a separate run queue for each of said CPUs; each said run queue holding a list of the processes waiting to run on the corresponding CPU;

process creation means in at least one of said CPUs for creating new processes, for assigning one of said CPUs as the home site of each new process, and for installing said new process in the local memory means for said home site; and cross processor call means in each of said CPUs for temporarily transferring a specified process from its home site to another one of said CPUs, for the purpose of performing a task which cannot be performed on said home site, said cross processor call means including means for:

(a) placing said specified process on the run queue of said other CPU;

(b) continuing the execution of said specified process on said other CPU, using the memory means for said specified process's home site as the resident memory for said process and using said interprocessor bus means to couple said other CPU to said home site memory means, until a predefined set of tasks has been completed; and then (c) upon completion of said predefined set of tasks, automatically returning said specified process to its home site by placing said specified process on the run queue of said specified process's home site, so that execution of the process will resume on said specified process's home site.

2. A computer system as set forth in claim 1, wherein said random access memory means of a first one of said CPUs includes kernel means having a predefined set of software routines for performing predefined kernel functions;

said computer system further including memory management means coupled to said random access memory means of said CPUs, including table means for denoting which portions of said kernel means are used by each of said CPUs other than said first CPU; and kernel copy means, coupled to said table means, for periodically copying into the local random access memory means of each of said other CPUs said kernel portions denoted in said table means as used by said CPU but not previously copied into the local random access memory means of said CPU;

whereby the use of said interprocessor bus for accessing said kernel means is reduced by providing copies, in the local memory means of each CPU, of those portions of said kernel means actually used by each CPU.

3. A computer system as set forth in claim 1, wherein said process creation means includes means for assigning a home site priority to each new process, said home site priority being assigned a value within a predefined range of priority values;

said system further includes process selection means for selecting a process to run on a specified one of said CPUs, when the process currently running in said specified CPU is stopped, by selecting the process in said run queue for said specified CPU with the highest priority; and said cross processor call means further includes means for (d) assigning a specified process a higher priority than its home site priority when it is added to the run queue for a CPU other than its home site; and (e) resetting the priority for said specified process to its home site priority when said process is added to the run queue for its home site;

whereby a process transferred to a CPU other than its home site is given increased priority to accelerate selection of the process for running on said other CPU.

4. A computer system as set forth in claim 3, wherein at least one of said CPUs includes preemption means for finding the highest priority process in its run queue, said preemption means including means for stopping the process currently running said CPU, when said highest priority process has higher priority than the process currently running in said CPU, and then running said highest priority process;

at least one of said CPUs includes interrupt means for activating said preemption means in another one of said CPUs; and said cross processor call means further includes means for (f) using said interrupt means in said specified process's home site CPU to activate said preemption means in a specified CPU when said specified process is added to the run queue for said specified CPU;

whereby a process transferred to a CPU other than its home site will be run immediately if its assigned priority is greater than the priorities assigned to the process currently running in said other CPU and to other processes, if any, in said run queue for said other CPU.

5. A computer system, comprising:

a multiplicity of distinct central processing units (CPUs), each having a separate, local, random access memory means to which said CPU has direct access; said CPUs having the capability of executing indivisible read modify write instructions;

at least one interprocessor bus coupling said CPUs to all of said memory means, so that each CPU can access both its own local memory means and the memory means of the other CPUs;

run queue means coupled to said CPUs for holding a separate run queue for each of said CPUs; each said run queue holding a list of the processes waiting to run on the corresponding CPU;

a run lock for each said run queue, said run lock having a first predefined value to indicate that the corresponding run queue is not in the process of being modified by any of said CPUs and is unlocked, and a value other than said first predefined value when the corresponding run queue is being modified by one of said CPUs and is therefore locked;

run queue updating means coupled to said CPUs for adding or removing a specified process from a specified run queue, said run queue updating means including means for:

(a) locking said specified run queue by (a,1) using an indivisible read modify write instruction to test the value of the run lock for said specified run queue and, if said run lock value indicates that said specified run queue is unlocked, to set said run lock to a value which indicates that said specified run queue is locked; and (a,2) if the test in step (a,1) determines that said run queue is locked, performing step (a,1) again after a predefined delay, until the test in step (a1) determines that said run queue is unlocked;

(b) adding or removing a specified process from said specified run queue; and (c) unlocking said specified run queue by setting said run lock for said specified run queue to said first predefined value;

process creation means in at least one of said CPUs for creating new processes, for assigning one of said CPUs as the home site of each new process, and for installing said new process in the local memory means for said home site; and cross processor call means in each of said CPUs for temporarily transferring a specified process from its home site to a specified one of said other CPUs, for the purpose of performing a task which cannot be performed on said home site, said cross processor call means including means for:

(a) using said run queue updating means to add said specified process to the run queue of said specified CPU;

(b) continuing the execution of said specified process on said specified CPU, using the memory means for said specified process's home site as the resident memory for said process and using said interprocessor bus means to couple said specified CPU to said home site memory means, until a predefined set of tasks has been completed; and then (c) upon completion of said predefined set of tasks, automatically returning said specified process to its home site by using said run queue updating means to add said specified process to the run queue of said specified process's home site, so that execution of the process will resume on said specified process's home site.

6. A computer system as set forth in claim 5, wherein said process creation means includes means for assigning a home site priority to each new process, said home site priority being assigned a value within a predefined range of priority values;

said system further includes process selection means for selecting a process to run on a specified one of said CPUs, when the process currently running in said specified CPU is stopped, by selecting the process in said run queue for said specified CPU with the highest priority; and said cross processor call means further includes means for (d) assigning a specified process a higher priority than its home site priority when it is added to the run queue for a CPU other than its home site; and (e) resetting the priority for said specified process to its home site priority when said process is added to the run queue for its home site;

whereby a process transferred to a CPU other than its home site is given increased priority to accelerate selection of the process for running on said other CPU.

7. A computer system as set forth in claim 6, wherein at least one of said CPUs includes preemption means for finding the highest priority process in its run queue, said preemption means including means for stopping the process currently running said CPU, when said highest priority process has higher priority than the process currently running in said CPU, and then running said highest priority process;

at least one of said CPUs includes interrupt means for activating said preemption means in another one of said CPUs; and said cross processor call means further includes means for (f) using said interrupt means in said specified process's home site CPU to activate said preemption means in a specified CPU when said specified process is added to the run queue for said specified CPU;

whereby a process transferred to a CPU other than its home site will be run immediately if its assigned priority is greater than the priorities assigned to the process currently running in said other CPU and to other processes, if any, in said run queue for said other CPU.

8. A computer system, comprising:

a multiplicity of distinct central processing units (CPUs), each having a separate, local, random access memory means to which said CPU has direct access; said CPUs having the capability of executing indivisible read modify write instructions;

at least one interprocessor bus coupling said CPUs to all of said memory means, so that each CPU can access both its own local memory means and the memory means of the other CPUs;

process creation means coupled to said CPUs for creating new processes, for assigning one of said CPUs as the home site of each new process, for installing said new process in the local memory means for said home site, and for assigning a home site priority to each new process, said home site priority being assigned a value within a predefined range of priority values;

run queue means coupled to said CPUs for holding a separate run queue for each of said CPUs; each said run queue holding a list of the processes waiting to run on the corresponding CPU;

process table means coupled to said CPUs for retaining information regarding every process running or otherwise in existence in said system, including for each said process a HOME CPU parameter which indicates the home site of said process;

a CURRENT CPU parameter which indicates the current CPU on which said process is running, waiting to run, or otherwise residing; and a PRIORITY parameter indicative of the priority of said process;

cpustate table means for storing information regarding each said CPU, including:

a run queue header identifying the run queue for said CPU;

a current process parameter identifying the process currently running in said CPU;

a last process parameter identifying the process which was run prior to the process currently running in said CPU; and a run lock parameter which is given a first predefined value to indicate that the corresponding run queue is not in the process of being modified by any of said CPUs and is unlocked, and a value other than said first predefined value when the corresponding run queue is being modified by one of said CPUs and is therefore locked; and run queue updating means coupled to said CPUs for adding or removing a specified process from a specified run queue, said run queue updating means including means for:
  (a) locking said specified run queue by
    (a,1) using said indivisible read modify write instruction to test the value of the run lock for said specified run queue and, if said run lock value indicates that said specified run queue is unlocked, to set said run lock to a value which indicates that said specified run queue is locked; and
    (a,2) if the test in step (a,1) determines that said run queue is locked, performing step (a,1) again after a predefined delay, until the test in step (a1) determines that said run queue is unlocked;
  (b) adding or removing a specified process from said specified run queue;
  (c) unlocking said specified run queue by setting said run lock for said specified run queue to said first predefined value; and
  (d) updating said run queue header, current process and last process parameters of the cpustate table means for the CPU corresponding to said specified run queue to reflect the current status of said CPU;

process selection means in at least one of said CPUs for selecting a process to run on a specified one of said CPUs when the process currently running in said specified CPU is stopped, including means for selecting the process in said run queue for said specified CPU with the highest priority and means for initiating the running of said selected process in said specified CPU; and preemption means in each CPU for finding the highest priority process in its run queue, said preemption means including means for stopping the process currently running in said CPU, when said highest priority process has higher priority than the process currently running in said CPU, and then running said highest priority process;

interrupt means in each said CPU for activating said preemption means in a specified one of the other CPUs; and cross processor call means in each of said CPUs for temporarily transferring a specified process from its home site to a specified one of said other CPUs, for the purpose of performing a task which cannot be performed on said home site, said cross processor call means including means for:
  (a) using said run queue updating means to add said specified process to the run queue of said specified CPU;
  (b) assigning said specified process a higher priority than its home site priority when it is added to said run queue for said specified other CPU;
  (c) using said interrupt means in said specified process's home site CPU to activate said preemption means in said specified CPU when said specified process is added to said run queue for said specified CPU, so that said specified process will be preempt the process currently running in said specified CPU;
  (d) continuing the execution of said specified process on said specified CPU, using the memory means for said specified process's home site as the resident memory for said process and using said interprocessor bus means to couple said specified CPU to said home site memory means, until a predefined set of tasks has been completed; and then
  (e) upon completion of said predefined set of tasks, automatically returning said specified process to its home site by using said run queue updating means to add said specified process to the run queue of said specified process's home site, so that execution of the process will resume on said specified process's home site; and
  (f) resetting the priority for said specified process to its home site priority when said process is added to said run queue for its home site.

9. A method of running a multiplicity of processes in a computer system, comprising the steps of:
  providing a computer system having
    (1) a multiplicity of distinct central processing units (CPUs), each having a separate, local, random access memory means to which said CPU has direct access; said CPUs having the capability of executing indivisible read modify write instructions; and
    (2) at least one interprocessor bus coupling said CPUs to all of said memory means, so that each CPU can access both its own local memory means and the memory means of the other CPUs;
    wherein at least one of said CPUs is capable of performing one or more tasks that at least one of said other CPUs cannot perform;
  generating a run queue data structure for holding a separate run queue for each of said CPUs; each said run queue holding a list of the processes waiting to run on the corresponding CPU;
  providing run queue updating means for adding or removing a specified process from a specified run queue;
  creating new processes, as the need arises, including the step of assigning one of said CPUs as the home site of each new process, and installing said new process in the local memory means for said home site; and
  when one of said processes needs to perform a task which cannot be performed on its home site, performing a cross processor call to temporarily transfer said process from its home site to a specified one of said other CPUs which is able to perform said task, be performing the steps of:
    (a) using said run queue updating means to add said process to the run queue of said specified CPU;
    (b) continuing the execution of said process on said specified CPU, using the memory means for said process's home site as the resident memory for said process and using said interprocessor bus means to couple said specified CPU to said home site memory means, until a predefined set of tasks has been completed; and then
    (c) upon completion of said predefined set of tasks, automatically returning said specified process to its home site by using said run queue updating means to add said process to the run queue of said process's home site, so that execution of the process will resume on said process's home site.

10. A method as set forth in claim 9, further including the step of generating a run lock flag for each said run queue, said run lock having a first predefined value to indicate that the corresponding run queue is not in the process of being modified by any of said CPUs and is unlocked, and a value other than said first predefined value when the corresponding run queue is being modified by one of said CPUs and is therefore locked;

wherein said step of providing run queue updating means includes providing run queue updating means for adding or removing a specified process from a specified run queue by performing the steps of:

(a) locking said specified run queue by
  (a,1) using said indivisible read modify write instruction to test the value of the run lock for said specified run queue and, if said run lock value indicates that said specified run queue is unlocked, to set said run lock to a value which indicates that said specified run queue is locked; and
  (a,2) if the test in step (a,1) determines that said run queue is locked, performing step (a,1) again after a predefined delay, until the test in step (a1) determines that said run queue is unlocked;
(b) adding or removing a specified process from said specified run queue; and
(c) unlocking said specified run queue by setting said run lock for said specified run queue to said first predefined value.

11. A method as set forth in claim 9, wherein said step of creating new processes includes assigning a home site priority to each new process, said home site priority being assigned a value within a predefined range of priority values;

said method further including the step of selecting a process to run on a specified one of said CPUs, when the process currently running in said specified CPU is stopped, by selecting the process in said run queue for said specified CPU with the highest priority; and said step of performing a cross processor call further includes the steps of (d) assigning a specified process a higher priority than its home site priority when it is added to the run queue for a CPU other than its home site; and (e) resetting the priority for said specified process to its home site priority when said process is added to the run queue for its home site;

whereby a process transferred to a CPU other than its home site is given increased priority to accelerate selection of the process for running on said other CPU.

12. A method as set forth in claim 11, wherein said step of performing a cross processor call further includes the step of (f) generating a preemption interrupt in said specified CPU when said specified process is added to the run queue for said specified CPU;

said method further including the step of responding to a preemption interrupt in a specified CPU by:

(a) finding the highest priority process in the run queue of said specified CPU; and
(b) stopping the process currently running in said CPU, when said highest priority process has higher priority than the process currently running in said CPU, and then running said highest priority process;

whereby a process transferred to a CPU other than its home site will be run immediately if its assigned priority is greater than the priorities assigned to the process currently running in said other CPU and to other processes, if any, in said run queue for said other CPU.

13. A method as set forth in claim 9, further including the steps of:

providing a predefined set of kernel routines in said local memory means of a first one of said CPUs;

denoting, in a predefined data structure, which of said kernel routines are used by each of said CPUs other than said first CPU; and periodically copying into the local random access memory means of each of said other CPUs said kernel routines denoted in said predefined data structure as used by said CPU but not previously copied into the local random access memory means of said CPU;

whereby the use of said interprocessor bus for accessing said kernel routines is reduced by providing copies, in the local memory means of each CPU, of those kernel routines actually used by each CPU.

* * * * *